United States Patent
Omoto et al.

(10) Patent No.: US 11,404,190 B2
(45) Date of Patent: Aug. 2, 2022

(54) HEXAGONAL FERRITE MAGNETIC POWDER

(71) Applicants: DOWA ELECTRONICS MATERIALS CO., LTD., Tokyo (JP); FUJIFILM Corporation, Tokyo (JP)

(72) Inventors: Hirohisa Omoto, Tokyo (JP); Shuji Kaneda, Tokyo (JP); Hiroyuki Suzuki, Kanagawa (JP); Toshio Tada, Kanagawa (JP)

(73) Assignees: DOWA ELECTRONICS MATERIALS CO., LTD., Tokyo (JP); FUJIFILM CORPORATION, Tokyo (JP)

( * ) Notice: Subject to any disclaimer, the term of this patent is extended or adjusted under 35 U.S.C. 154(b) by 309 days.

(21) Appl. No.: 16/702,629

(22) Filed: Dec. 4, 2019

(65) Prior Publication Data

US 2020/0185135 A1 Jun. 11, 2020

(30) Foreign Application Priority Data

Dec. 6, 2018 (JP) .............................. JP2018-229078

(51) Int. Cl.
*H01F 1/34* (2006.01)
*G11B 5/706* (2006.01)
(52) U.S. Cl.
CPC ......... *H01F 1/344* (2013.01); *G11B 5/70678* (2013.01)

(58) Field of Classification Search
None
See application file for complete search history.

(56) References Cited

U.S. PATENT DOCUMENTS

| 2011/0244272 A1* | 10/2011 | Suzuki | .............. C04B 35/62665 |
| | | | 428/842.8 |
| 2016/0141084 A1* | 5/2016 | Shirata | ............... G11B 5/70678 |
| | | | 428/842.8 |
| 2020/0161035 A1* | 5/2020 | Omoto | .................... H01F 1/348 |

FOREIGN PATENT DOCUMENTS

JP 2016-139451 8/2016

\* cited by examiner

*Primary Examiner* — Kevin M Bernatz
(74) *Attorney, Agent, or Firm* — Clark & Brody LP

(57) ABSTRACT

Provided is a hexagonal ferrite magnetic powder for a magnetic recording medium, containing hexagonal ferrite magnetic particles having aluminum hydroxide adhered on the surface thereof, the hexagonal ferrite magnetic powder having an Al/Fe molar ratio of 0.030 to 0.200, a Co/Fe molar ratio of 0.002 to 0.030, and a Nb/Fe molar ratio of 0.005 to 0.050, and having an Fe site valence $A_{Fe}$ of 3.015 to 3.040 as calculated by $A_{Fe}=(3+2\times[Co/Fe]+5\times[Nb/Fe])/(1+[Co/Fe]+[Nb/Fe])$ wherein [Co/Fe] represents the Co/Fe molar ratio and [Nb/Fe] represents the Nb/Fe molar ratio, and preferably having an activation volume Vact of 1400 to 1800 $nm^3$. This magnetic powder simultaneously achieves an increase in magnetic characteristics including SNR of a magnetic recording medium and a further increase in durability thereof.

3 Claims, No Drawings

HEXAGONAL FERRITE MAGNETIC POWDER

BACKGROUND OF THE INVENTION

Technical Field

The present invention relates to M-type hexagonal ferrite magnetic powder for a magnetic recording medium.

Background Art

Hexagonal ferrite magnetic powder is known as magnetic powder suitable for high density recording for use in a magnetic recording medium, such as magnetic tape. Important performance characteristics of magnetic recording media include high SNR (S/N ratio) and high durability during running in a drive, in addition to high recording density.

Patent Document 1 discloses a technique for simultaneously improving SNR and durability of a magnetic recording medium by applying a hexagonal ferrite magnetic powder that has a rare earth element and Bi incorporated therein and that has aluminum hydroxide adhered on the particle surface thereof.

RELATED ART DOCUMENT

Patent Document
Patent Document 1: JP-A-2016-139451

SUMMARY OF THE INVENTION

Technical Problem

With recent increasing application of digital data, a magnetic recording medium which plays a role of storing enormous data is desired to be further improved in both the magnetic characteristics and the durability.

Recording and reproduction of information into and from a magnetic recording medium are typically achieved by running a magnetic recording medium (magnetic tape, etc.) in a drive with the magnetic layer surface thereof in slidable contact with a magnetic head. An effective technique for improving the electromagnetic conversion characteristics here is to increase smoothness of the magnetic layer surface. Then, the magnetic powder disclosed in Patent Document 1 which had been considered effective for simultaneous improvement of SNR and durability was applied to a magnetic layer coating liquid that was developed for producing a highly smooth magnetic layer to thereby produce a magnetic recording medium. However, it was found that even the magnetic powder disclosed in Patent Document 1 did not provide a sufficient effect in improvement of durability of the magnetic recording medium.

An object of the present invention is to provide a magnetic powder that can simultaneously achieve an increase in magnetic characteristics including SNR of a magnetic recording medium and a further increase in durability thereof.

As a result of intensive studies, the present inventors have found that, in M-type hexagonal ferrite magnetic powder, when the average valence of the Fe site atoms is strictly controlled by incorporating Co and Nb and aluminum hydroxide is adhered on the particle surface, this is quite effective for a significant increase in SNR and durability of a magnetic recording medium.

Specifically, the above object can be achieved by a hexagonal ferrite magnetic powder for a magnetic recording medium, the hexagonal ferrite magnetic powder containing hexagonal ferrite magnetic particles having aluminum hydroxide adhered on the surface thereof, the hexagonal ferrite magnetic powder having an Al/Fe molar ratio of 0.030 to 0.200, a Co/Fe molar ratio of 0.002 to 0.030, and a Nb/Fe molar ratio of 0.005 to 0.050, and having an Fe site valence $A_{Fe}$ of 3.015 to 3.040 as calculated by the following formula (1). The activation volume Vact of the magnetic powder can be, for example, 1400 to 1800 $nm^3$.

$$A_{Fe}=(3+2\times[Co/Fe]+5\times[Nb/Fe])/(1+[Co/Fe]+[Nb/Fe]) \quad (1)$$

wherein [Co/Fe] represents the Co/Fe molar ratio and [Nb/Fe] represents the Nb/Fe molar ratio.

Advantageous Effects of Invention

The magnetic powder of the present invention can build a magnetic recording medium that stably exhibits a superior effect of improving SNR and durability even when applied to a magnetic layer coating liquid with a formulation having a high effect of increasing smoothness of a magnetic layer.

DETAILED DESCRIPTION OF THE INVENTION

Hexagonal Ferrite Magnetic Powder
Composition

The hexagonal ferrite subject to the present invention is a magnetoplumbite-type (M-type) hexagonal ferrite whose basic structure is $BaO \cdot 6Fe_2O_3$. The Fe sites are partially substituted by a divalent transition metal Co and a pentavalent transition metal Nb. The Co/Fe molar ratio is in the range of 0.002 to 0.030. The Nb/Fe molar ratio is in the range of 0.005 to 0.050. With the molar ratios, it is possible to achieve both of superior SNR characteristics and superior durability of a magnetic recording medium produced with the magnetic powder of the present invention.

In a hexagonal ferrite, the Fe sites are generally partially substituted by one or more of divalent transition metals M2's, tetravalent transition metals M4's, and pentavalent transition metals M5's. Examples of divalent transition metals M2's include Co and Zn, examples of tetravalent transition metals M4's include Ti and Sn, and examples of pentavalent transition metals M5's include Nb and Ta. Substitution by such transition metals can adjust magnetic characteristics, such as coercive force Hc. One measure of the average valence of the Fe site atoms is an Fe site valence. A generalized Fe site valence in the case where the Fe sites are substituted by one or more of divalent transition metals M2's, tetravalent transition metals M4's, and pentavalent transition metals M5's is herein expressed by $X_{Fe}$. The Fe site valence $X_{Fe}$ is represented by the following formula (2):

$$X_{Fe}=(3+2\times[M2/Fe]+4\times[M4/Fe]+5\times[M5/Fe])/(1+[M2/Fe]+[M4/Fe]+[M5/Fe]) \quad (2)$$

wherein [M2/Fe] represents the molar ratio of the divalent transition metals M2's to Fe, [M4/Fe] represents the molar ratio of the tetravalent transition metals M4's to Fe, and [M5/Fe] represents the molar ratio of the pentavalent transition metals M5's to Fe.

The Fe site valence $X_{Fe}$ has heretofore been generally adjusted to a value around 3.000 which means a valence as close as possible to trivalent.

Divalent Co and pentavalent Nb are herein used as a substituting element of Fe sites. Thus, as an Fe site valence defined by contents of Co and Nb, $A_{Fe}$ according to the following formula (1) is introduced:

$$A_{Fe}=(3+2\times[Co/Fe]+5\times[Nb/Fe])/(1+[Co/Fe]+[Nb/Fe]) \quad (1)$$

wherein [Co/Fe] represents the Co/Fe molar ratio and [Nb/Fe] represents the Nb/Fe molar ratio.

As a result of studies, the present inventors have found that when the Fe sites are partially substituted by Co and Nb while not only adjusting the substituting amount but shifting the average valence of the Fe site atoms slightly to the positive side from three, both the SNR and durability can be increased more effectively than ever in a magnetic recording medium having a highly smooth magnetic layer formed. Specifically, a highly effective approach is to strictly control the composition so as to have an Fe site valence $A_{Fe}$ in the range of 3.015 to 3.040. An $A_{Fe}$ lower than the above range leads to reduction in the effect of increasing durability of a magnetic recording medium. An $A_{Fe}$ higher than the above range leads to reduction in the effect of increasing SNR of a magnetic recording medium. No other substituting element for the Fe sites than Co and Nb has to be added. In other words, such a composition that the generalized Fe site valence $X_{Fe}$ is equal to the Fe site valence Ape according to the formula (1) can be applied. In this case, the adjustment of the Fe site valence $A_{Fe}$ in the range of 3.015 to 3.040 means adjustment of the generalized Fe site valence $X_{Fe}$ also in the range of 3.015 to 3.040.

The hexagonal ferrite magnetic powder of the present invention contains Al. Al is adhered as aluminum hydroxide on the surface of the hexagonal ferrite particles. A coating layer produced by the following procedure is highly effective for increasing durability of a magnetic layer in a magnetic recording medium (for example, magnetic tape): a hexagonal ferrite powder synthesized through sintering is washed and then dried to produce a dried powder, and aluminum hydroxide composed of one or two or more of aluminum hydroxide, bayerite, boehmite, and amorphous aluminum hydroxide gel is adhered on the surface of the dried powder to produce the coating layer. The effect of increasing durability is exhibited by adhering aluminum hydroxide so that the Al/Fe molar ratio in the magnetic powder is 0.030 or more. In a more effective manner, the Al/Fe molar ratio is 0.038 or more. However, excess nonmagnetic component Al may cause reduction in magnetic characteristics. Thus, the Al/Fe molar ratio is desirably 0.200 or less and may be controlled to 0.100 or less. As a treatment for adhering aluminum hydroxide, a technique disclosed in Patent Document 1 can be used. The aluminum hydroxide adhered on the hexagonal ferrite particle surface can be identified by XAFS (X-ray absorption fine structure) analysis.

The hexagonal ferrite magnetic powder of the present invention may contain Bi. Bi is an element that is effective for size reduction of particles and improvement of magnetic characteristics. The most of Bi in a raw material mixture remains in the hexagonal ferrite magnetic powder. For sufficiently obtaining the above effect of Bi, the amount of Bi added in the raw material mixture is preferably adjusted so that the Bi/Fe molar ratio in the magnetic powder becomes 0.001 to 0.100. The amount of Bi may be controlled in the range of 0.010 to 0.050.

Activation Volume Vact

The activation volume Vact which is calculated by measurement of magnetic characteristics of a powder is desirably 1400 to 1800 nm³. When a magnetic powder is used in a magnetic recording medium, a higher density of the magnetic powder is more effective for increase in SNR (reduction in noise). In this meaning, a magnetic powder having a small Vact is advantageously applied. However, it is necessary to make the particles very fine for extremely decreasing the Vact, making the production difficult. Furthermore, in the case of an M-type hexagonal ferrite having alkaline earth metal element sites of Ba, a smaller particle size leads to increased Ba loss in an acid washing step. The Ba loss results in deterioration in magnetic characteristics and becomes a factor cancelling the effect of increasing SNR due to the decreased particle size (i.e., reduction in Vact). On the other hand, a larger Vact is more advantageous for suppressing the Ba loss, although the effect of increasing SNR of a magnetic recording medium decreases due to the large particle size, and cannot meet a recent strict requirement in the SNR characteristics. As a result of intensive studies on the foregoing points, it has been found that when especially emphasizing increase in SNR in a hexagonal ferrite magnetic powder, the activation volume Vact is desirably in the range of 1400 to 1800 nm³.

When a hexagonal ferrite is synthesized by a technique of crystallizing an amorphous body in a raw material mixture, the activation volume Vact of the resulting hexagonal ferrite powder can be controlled by the combination of "the composition of the amorphous body" and "the crystallization conditions (especially the heating temperature)".

Powder Magnetic Characteristics

The magnetic powder subject to the present invention desirably has a coercive force Hc of 159 to 239 kA/m (about 2000 to 3000 Oe) and desirably has a coercive force distribution SFD of 0.4 to 1.0. The saturation magnetization σs may be adjusted in the range of 40.0 to 50.0 A·m²/kg and squareness ratio SQ may be adjusted in the range of 0.48 to 0.56.

BET Specific Surface Area

As described above, particle size reduction of the magnetic powder used is effective for decreasing noise of a magnetic recording medium. When the particle size factor is viewed in terms of a specific surface area, the BET specific surface area according to single-point BET is desirably 50 to 130 m²/g.

Method of Producing Magnetic Powder

The hexagonal ferrite magnetic powder according to the present invention can be produced by a technique of crystallizing an amorphous body in a raw material mixture. Specifically, the hexagonal ferrite magnetic powder can be produced through, for example, the following steps.

Raw Material Mixing Step

Various raw materials containing elements constituting the hexagonal ferrite magnetic powder and elements required for forming an amorphous body are mixed to obtain a raw material mixed powder. The hexagonal ferrite magnetic powder according to the present invention has a BaO·6Fe₂O₃-type basic structure and Fe is partially substituted by Co and Nb. As a source of a metal element among the elements, an oxide or a hydroxide of the metal element is typically used. $BaCO_3$ and $H_3BO_3$ are desirably used as sources of Ba and B, respectively. The raw materials are mixed under stirring in a mixer to provide a raw material mixture. The raw materials are desirably subjected to shearing mixing in a mixer having a stirring blade, such as a Henschel mixer.

Granulation Step

The resulting raw material mixture is generally formed into a spherical granulated product having a prescribed particle size in consideration of handleability in the subsequent steps. The raw material mixture is shaped into spheres by using, for example, a pan-type granulator while adding water or, as needed, a binder component, to form granules having a diameter of about 1 to 50 mm, which is then heated to about 200 to 300° C. and dried. A granulated product is thus obtained.

Amorphization Step

The raw material mixture after drying (the granulated product) is heated and melt at a high temperature to obtain a melt of 1350 to 1450° C. The melt is quenched to obtain an amorphous body. Examples of techniques for quenching include a twin roller method, a gas atomizing method, a water atomizing method, and a centrifugal atomizing method. According to studies by the present inventors, when hexagonal ferrite crystals having a reduced particle size and having an activation volume Vact in the above range is to be produced, acquisition of an amorphous body by a gas atomizing method is more effective. The resulting amorphous body may be crushed by a ball mill or the like, as needed, and then may be adjusted in the particle size.

Crystallization Step

The amorphous body is heated and kept at a temperature in the range of 580 to 720° C. to thereby precipitate hexagonal ferrite crystals. The retention time may typically be 60 to 240 minutes. The powder obtained by the heat treatment for crystallization contains, in addition to hexagonal ferrite crystals, substances resulting from crystallization of remaining components which was contained in the amorphous body (mainly barium borate crystals).

Acid Washing Step

Next, for extracting hexagonal ferrite particles from the powder obtained by the crystallization step, the remaining substances mainly containing barium borate were removed by dissolving in acid. This treatment is herein referred to as "acid washing". A suitable acid washing liquid is an aqueous acetic acid solution having a concentration of 2 to 20% by mass. The powder obtained by the crystallization step is immersed in an acid washing liquid and kept at a temperature of the boiling point or lower. Stirring of the liquid is effective. The pH of the liquid is preferably 5.0 or lower. After completion of the dissolution of the remaining components, solid and liquid are separated to extract the hexagonal ferrite powder.

The acid washing liquid, which is attached on the hexagonal ferrite powder extracted by the solid-liquid separation, is washed with water. This treatment is herein referred to as "water washing". A treatment of neutralization with an aqueous alkali solution, such as aqueous ammonia, an aqueous sodium hydroxide solution, or an aqueous potassium hydroxide solution, can be performed, as needed, as an initial stage of the water washing. The concentration of the aqueous alkali solution may be adjusted in the range of 0.01 to 1.5 mol/L, for example, in the case of sodium hydroxide.

Pulverizing Step Before Adhering

When aluminum hydroxide is adhered on the thus obtained hexagonal ferrite, a pulverizing treatment is applied to make the hexagonal ferrite into fine powder. A general wet mill may be applied for the pulverizing treatment in this stage. Specifically, the hexagonal ferrite is preferably sufficiently reduced in size prior to the aluminum hydroxide adhering treatment so that particle sizes of 90% or more of all the particles fall in the range of 0.1 to 100 μm in particle size distribution by volume as measured with a laser diffraction particle size analyzer.

Aluminum Hydroxide Adhering Step

Aluminum hydroxide may be adhered on the hexagonal ferrite particles obtained by the acid washing step. Aluminum hydroxide, bayerite, boehmite, and amorphous aluminum hydroxide gel are herein collectedly referred to as aluminum hydroxide.

The hexagonal ferrite particles are dispersed in an aqueous solution in which an aluminum salt is dissolved to form a slurry. An alkali is added to the slurry to cause a reaction to produce aluminum hydroxide, thus forming an aluminum hydroxide layer on the surface of the hexagonal ferrite particles. The temperature of the slurry may be about 25 to 50° C. The pH of the liquid before the reaction (before the alkali addition) is preferably 2.0 to 5.0 and more preferably in the range of 2.0 to 4.0. With a pH before the reaction lower than 2.0, a part of hexagonal ferrite particles is likely to dissolve, which may lead to deterioration in the magnetic characteristics in some cases. The pH of the liquid during the reaction is preferably adjusted to 7.0 to 10.0. With a pH lower than 7.0 or higher than 10.0, it is difficult to sufficiently generate aluminum hydroxide which is effective for increase in durability of a magnetic recording medium and to adhere the aluminum hydroxide on the hexagonal ferrite particle surface. After the completion of the reaction, the slurry is desirably stirred in the above temperature range for about 5 to 30 minutes. As the aluminum salt, aluminum chloride, aluminum nitrate, aluminum sulfate, aluminum phosphate, aluminum citrate, aluminum acetate, or the like can be applied. As the alkali, sodium hydroxide, potassium hydroxide, ammonia, or the like can be applied. The amount of the aluminum salt used is desirably set so that the amount of Al in terms of $Al(OH)_3$ is 1 to 17 parts by mass based on 100 parts by mass of solid (the hexagonal ferrite particles after wet pulverizing).

Filtering Step and Drying Step

Next, a slurry containing hexagonal ferrite particles is subjected to solid-liquid separation by a method of filtration or the like to collect the solid. The solid is sufficiently washed with water. Specifically, the water washing is desirably thoroughly performed so that the electrical conductivity of the post-washing liquid (filtrate) becomes 10 μS/cm or less.

The solid after completion of water washing is dried at a temperature lower than 120° C., more preferably 115° C., or lower. The drying time may be selected, for example, in the range of 1 to 20 hours. With a high drying temperature, it is difficult to significantly improve durability of a magnetic recording medium in a stable manner. The lower limit of the drying temperature is not limited and may be room temperature. For example, the temperature can be set at 20° C. or higher. Thus, a dry powder containing hexagonal ferrite magnetic particles or a dry powder containing magnetic particles having aluminum hydroxide adhered on the surface of hexagonal ferrite particles is obtained. The dry powder may be subjected to a final finishing pulverizing treatment to adjust the particle size distribution.

EXAMPLES

Example 1

Production of Hexagonal Ferrite Magnetic Powder

Boric acid $H_3BO_3$ (industrial grade), barium carbonate $BaCO_3$ (industrial grade), iron oxide $Fe_2O_3$ (industrial grade), cobalt oxide COO (regent grade, 90% or higher), and niobium oxide $Nb_2O_5$ (industrial grade) were weighed to make a raw material formulation shown in Table 1, and were mixed with an FM mixer manufactured by Mitsui Miike Machinery to obtain a raw material mixture. The raw material mixture was placed in a pelletizer, was granulated into spheres while spraying water, and then was dried at 270° C. for 14 hours to obtain a granulated product having a particle size of 1 to 50 mm.

The granulated product was melt in a platinum crucible in a melting furnace. The temperature was raised to 1400° C. and was kept for 60 minutes with stirring to make the raw materials into a completely melt state. Then the melt (hot metal) was drawn through a nozzle and was quenched by a gas atomizing method to obtain an amorphous body. The resulting amorphous body was heated and kept at a prescribed temperature to effect crystallization, thus producing hexagonal ferrite. The heated and kept temperature is referred to as "crystallization treatment temperature". The keeping time at the crystallization treatment temperature was 60 minutes.

A powder body obtained by the heating and keeping contains, in addition to hexagonal ferrite, remaining substances mainly containing barium borate. The powder body is hereinafter referred to as a "powder body after crystallization". Acid washing for removing the remaining substances was performed under the following conditions.

Acid Washing Conditions:

The powder body after crystallization was immersed in a 10 mass % aqueous acetic acid solution heated to 60° C. and was kept for 1 hour with stirring to dissolve the remaining substances in the liquid, followed by filtration for solid-liquid separation, and pure water was added for washing.

Then, pure water was added to the collected solid and the mixture was stirred and was subjected to wet pulverizing with a stir mill.

An aqueous aluminum chloride solution was added to a slurry containing solid after the wet pulverizing. The amount of Al added in the form of aluminum chloride was 3.3 parts by mass in terms of $Al(OH)_3$ based on 100 parts by mass of solid. The slurry after addition of the aqueous aluminum chloride solution was stirred at 40° C. for 10 minutes. This slurry had a pH in the range of 3.0 to 4.0. Subsequently, sodium hydroxide was added to adjust the pH to 8.0 to 9.0. Then the slurry was further stirred at 40° C. for 10 minutes to form a layer of aluminum hydroxide which was a reaction product on the surface of the solid particles (hexagonal ferrite magnetic particles). Then, solid-liquid separation was performed by filtration and pure water was added to perform water washing until electrical conductivity of the post-washing liquid (filtrate) became 10 µS/cm or less. After water washing, drying in the air at 110° C. was performed for 12 hours and then a dry pulverizing treatment was applied with a disc mill (Premax PR-100, manufactured by Chuo Kakohki Co., Ltd.). In this manner, a dry powder having aluminum hydroxide adhered on the surface of hexagonal ferrite particles was obtained. This powder was subjected to investigation as a sample powder.

Composition Analysis of Magnetic Powder

The sample powder was subjected to composition analysis with a high frequency induction plasma coupled emission spectrometer ICP (720-ES) manufactured by Agilent Technologies Japan, Ltd. The molar ratio of each element to Fe was calculated from the obtained quantitative value. An X/Fe molar ratio for a certain element X (X is, for example, Co, Al, or the like) is calculated by the following formula.

X/Fe molar ratio=X content (% by mole)/Fe content (% by mole)

For the Ba content, the ratio was represented with a Ba/(Fe site elements) molar ratio calculated by the following formula.

Ba/(Fe site elements) molar ratio=(Ba content (% by mole))/(total content of Fe and transition metal elements partially substituting Fe sites (% by mole))

In the case of this example, the transition metal elements partially substituting Fe sites were only Co and Nb, and thus the Ba/(Fe site elements) molar ratio=Ba content (% by mole)/(Fe content (% by mole)+Co content (% by mole)+Nb content (% by mole)).

Fe Site Valence

The Fe site valence $A_{Fe}$ defined by the contents of Co and Nb and the generalized Fe site valence $X_{Fe}$ were determined by the above formula (1) and formula (2), respectively. In this example, since the transition metal elements partially substituting the Fe sites are only Co and Nb, $A_{Fe}=X_{Fe}$ is satisfied.

Measurement of Powder Magnetic Characteristics

A sample powder was charged in a plastic container of 6 mmφ and the

Calculation of Activation Volume Vact coercive force Hc, the saturation magnetization σs, the squareness ratio SQ, and the coercive force distribution SFD (SFD value of the powder body in a bulk state) were measured with a VSM apparatus (VSM-P7-15) manufactured by Toei Industry Co., Ltd. at an external magnetic field of 795.8 kA/m (10 kOe).

Measurement of BET Specific Surface Area

For a sample powder, the specific surface area was determined with 4-Sorb US manufactured by Yuasa Ionics according to single-point BET.

A hexagonal ferrite magnetic powder was subjected to saturation magnetization using a pulse magnetic field generator (manufactured by Toei Industry) and a vibration sample-type fluxmeter (manufactured by Toei Industry), and then a magnetic field in a direction opposite to the direction of the saturation magnetization (referred to as reversed magnetic field) was applied for 0.76 ms. Then, the magnetic field was removed and the remaining magnetization at this time was measured. The value of the reversed magnetic field was varied, and the Hr value (0.76 ms) of the reversed magnetic field when the remaining magnetization was 0 $Am^2/kg$ was determined. This Hr is herein referred to as remaining coercive force. The value of the reversed magnetic field to be applied can be appropriately set by the Hr value of a magnetic substance. Next, the same operation was performed while changing the application time to 8.4 ms, and the remaining coercive force Hr (8.4 ms) when the remaining magnetization was 0 $Am^2/kg$ was determined. Furthermore, the same operation was performed while changing the application time to 17 s, and the remaining coercive force Hr (17 s) when the remaining magnetization was 0 $Am^2/kg$ was determined. H0 and KuV/kT were calculated from the following formula (3) with the Hr (0.76 ms), Hr (8.4 ms), and Hr (17 s), and the value was substituted in the following formula (4) to calculate the activation volume Vact:

$$Hr(t)=H0\{1-[(kT/KuV)\ln(f0t/\ln 2)]^{0.77}\} \quad (3)$$

k: Boltzmann constant, T: absolute temperature, Ku: magnetocrystalline anisotropy constant, V: activation volume, Hr (t): remaining coercive force (Oe) at an application time t, H0: remaining coercive force (Oe) at $10^{-9}$ seconds, f0: spin precession frequency ($s^{-1}$), t: reversed magnetic field holding time (s), f0 is $10^{-9}$ ($s^{-1}$) here.

$$Vact\ (nm^3)=1.505\times10^5\times KuV/kT/H0 \quad (4)$$

Production of Magnetic Recording Medium (Magnetic Tape)

"Parts" and "%" described for magnetic tape production hereinafter mean "parts by mass" and "% by mass", respectively, unless otherwise specified.

Formulation of Magnetic Layer Coating Liquid

Magnetic Liquid

Hexagonal barium ferrite magnetic powder particles: 100.0 parts
  Oleic acid: 2.0 parts
  Vinyl chloride copolymer (MR-104 manufactured by ZEON CORPORATION): 10.0 parts
  $SO_3Na$ group-containing polyurethane resin: 4.0 parts (weight average molecular weight 70,000, $SO_3Na$ group: 0.07 meq/g)
  Amine-based polymer (DISPERBYK-102 manufactured by BYK Japan KK): 6.0 parts
  Methyl ethyl ketone: 150.0 parts
  Cyclohexanone: 150.0 parts Abrasive Liquid
  α-Alumina (specific surface area: 19 m²/g, sphericity: 1.4): 6.0 parts
  $SO_3Na$ group-containing polyurethane resin (weight average molecular weight: 70,000, $SO_3Na$ group: 0.1 meq/g): 0.6 parts
  2,3-Dihydroxynaphthalene: 0.6 parts
Cyclohexanone: 23.0 parts Nonmagnetic Filler Liquid
  Colloidal silica (average particle size: 80 nm, coefficient of variation: 7%, sphericity: 1.03): 2.0 parts
  Methyl ethyl ketone: 8.0 parts Lubricant Curing Agent Liquid
  Stearic acid: 3.0 parts
  Stearic amide: 0.3 parts
  Butyl stearate: 6.0 parts
  Methyl ethyl ketone: 110.0 parts
  Cyclohexanone: 110.0 parts
  Polyisocyanate (CORONA=(registered tradename) L manufactured by Nippon Polyurethane Industry Co., Ltd.): 3 parts Formulation of Nonmagnetic Layer Coating Liquid
  Nonmagnetic powder body, α iron oxide (average long axis length: 10 nm, average aspect ratio: 1.9, BET specific surface area: 75 m²/g): 100 parts
  Carbon black (average particle size: 20 nm): 25 parts
  $SO_3Na$ group-containing polyurethane resin (average molecular weight 70,000, $SO_3Na$ group content: 0.2 meq/g): 18 parts
  Stearic acid: 1 part
  Cyclohexanone: 300 parts
  Methyl ethyl ketone: 300 parts Formulation of Backcoat Layer Coating Liquid
  Nonmagnetic inorganic powder: α iron oxide (average long axis length: 0.15 µm, average aspect ratio: 7, BET specific surface area: 52 m²/g): 80 parts
  Carbon black (average particle size: 20 nm): 20 parts
  Vinyl chloride copolymer: 13 parts
  Sulfonic acid salt group-containing polyurethane resin: 6 parts
  Phenylphosphonic acid: 3 parts
  Cyclohexanone: 155 parts
  Methyl ethyl ketone: 155 parts
  Stearic acid: 3 parts
  Butyl stearate: 3 parts
  Polyisocyanate: 5 parts
  Cyclohexanone: 200 parts Production of Magnetic Tape A magnetic layer coating liquid was produced by dispersing materials according to the formulation of magnetic layer coating liquid using a batch-type vertical sand mill with 0.5 mmϕ zirconia beads over 24 hours (bead dispersion) and then filtrating the dispersion through a filter having an average pore size of 0.5 µm.

A nonmagnetic layer coating liquid was produced by dispersing materials according to the formulation of nonmagnetic layer coating liquid using a batch-type vertical sand mill with 0.1 mmϕ zirconia beads over 24 hours (bead dispersion) and then filtrating the dispersion through a filter having an average pore size of 0.5 Mm. A backcoat layer coating liquid was produced as follows: materials other than the lubricant (stearic acid and butyl stearate), polyisocyanate, and 200 parts of cyclohexanone among the materials shown in the formulation of backcoat layer coating liquid were kneaded and diluted using an open-type kneader; the kneaded product was subjected to a dispersion treatment of 12 passes using a horizontal bead mill disperser with 1 mmϕ zirconia beads at a bead filling rate of 80%, a rotor tip peripheral speed of 10 m/s, and a retention time of 2 min/pass; then the remaining materials were added and the mixture was stirred with a dissolver; and the resulting dispersion was filtered through a filter having an average pore size of 1 µm.

The nonmagnetic layer coating liquid prepared above was applied on a surface of a polyethylene naphthalate support with a thickness of 5 µm (Young's modulus in width direction: 8 GPa, Young's modulus in longitudinal direction: 6 GPa) so that the thickness after drying was 100 nm and was dried, and then the magnetic layer coating liquid prepared above was applied thereon so that the thickness after drying was 70 nm. While the magnetic layer coating liquid was not dried yet, the application surface was subjected to a vertical orientation treatment in which a magnetic field with a strength of 0.3 T was vertically applied and was dried. Subsequently, the backcoat layer coating liquid prepared above was applied on the opposite surface of the support so that the thickness after drying was 0.4 µm and was dried. The resulting tape was subjected to a surface smoothening treatment with a calendar composed only of a metal roll at a speed of 100 m/min, a linear pressure of 300 kg/cm, and a temperature of 100° C., and then was subjected to a heat treatment under a dry environment at 70° C. for 36 hours. After the heat treatment, the tape was slit by a ½-inch width to obtain a magnetic tape.

For the formulation of magnetic layer coating liquid, the formulation of nonmagnetic layer coating liquid the formulation of backcoat layer coating liquid, and the procedure for producing a magnetic tape described above, a magnetic tape production technique that can enhance surface smoothness of a magnetic layer surface was applied.

Measurement of Electromagnetic Conversion Characteristics and Evaluation of Coating Durability The electromagnetic conversion characteristics of the produced magnetic tape was measured by the following method using a ½-inch (0.0127 m) reel tester with a fixed head.

The head/tape relative velocity was 6 m/s. The recording was performed using an MIG (metal-in-gap) head (gap length: 0.15 µm, track width: 1.0 µm) while setting the recording current to an optimal recording current for each magnetic tape. As a reproduction head, a GMR (giant-magnetoresistive) head having an element thickness of 15 nm, a shield interval of 0.1 µm, and a lead width of 0.5 µm was used. Signals were recorded at a linear recording density of 270 KFCI and reproduced signals were measured with a spectrum analyzer manufactured by ShibaSoku Co., Ltd. The ratio of the output of the carrier signal to the integral noise over the entire zone of the spectrum was taken as SNR. The signal used for the SNR measurement was taken from a part where the signal was sufficiently stabilized after the start of the magnetic tape running.

A magnetic tape was run 5000 passes in a reciprocating manner at 1000 m/pass at a temperature of 32° C. and a relative humidity of 80% under the above conditions. A sample having an SNR in the first pass of 1.0 dB or higher is evaluated as a hexagonal ferrite magnetic powder that can achieve noise characteristics applicable to high density recording in the future. Accordingly, in the evaluation of SNR of a magnetic recording medium, ones with a first pass SNR of 1.0 dB or higher were expressed as A and the others were expressed as B, and the evaluation A was determined to be acceptable.

The difference between SNR in the first pass and SNR in the 5000th pass ("SNR in the 5000th pass"–"SNR in the 1st pass") was obtained. A magnetic recording medium having such a difference of larger than −2.0 dB (i.e., having an absolute value of the difference of less than 2.0 dB), is evaluated as having very superior running durability. Accordingly, in the evaluation of durability of a magnetic recording medium, ones having an absolute value of the difference less than 2.0 dB were expressed as A, the others were expressed as B, and the evaluation A was determined to be acceptable.

The recording and reproduction of signals were performed by slidably moving the magnetic layer surface of a magnetic tape on a magnetic head.

The results are shown in Table 1.

Example 2

An experiment was conducted in the same conditions as in Example 1 except that boric acid $H_3BO_3$ (industrial grade), barium carbonate $BaCO_3$ (industrial grade), iron oxide $Fe_2O_3$ (industrial grade), cobalt oxide CoO (reagent grade, 90% or higher), and niobium oxide $Nb_2O_5$ (industrial grade) were weighed to give a raw material formulation shown in Table 1 and the crystallization treatment temperature was set to a temperature shown in Table 1. The results are shown in Table 1.

Example 3

An experiment was conducted in the same conditions as in Example 1 except that boric acid $H_3BO_3$ (industrial grade), barium carbonate $BaCO_3$ (industrial grade), iron oxide $Fe_2O_3$ (industrial grade), cobalt oxide CoO (reagent grade, 90% or higher), niobium oxide $Nb_2O_5$ (industrial grade), and bismuth oxide $Bi_2O_3$ (industrial grade) were weighed to give a raw material formulation shown in Table 1 and the crystallization treatment temperature was set to a temperature shown in Table 1. The results are shown in Table 1.

Example 4

An experiment was conducted in the same conditions as in Example 1 except that boric acid $H_3BO_3$ (industrial grade), barium carbonate $BaCO_3$ (industrial grade), iron oxide $Fe_2O_3$ (industrial grade), cobalt oxide COO (reagent grade, 90% or higher), niobium oxide $Nb_2O_5$ (industrial grade), and bismuth oxide $Bi_2O_3$ (industrial grade) were weighed to give a raw material formulation shown in Table 1 and the crystallization treatment temperature was set to a temperature shown in Table 1. The results are shown in Table 1.

Example 5

An experiment was conducted in the same conditions as in Example 1 except that boric acid $H_3BO_3$ (industrial grade), barium carbonate $BaCO_3$ (industrial grade), iron oxide $Fe_2O_3$ (industrial grade), cobalt oxide COO (reagent grade, 90% or higher), and niobium oxide $Nb_2O_5$ (industrial grade) were weighed to give a raw material formulation shown in Table 1, that the crystallization treatment temperature was set to a temperature shown in Table 1, and that the pulverizing treatment after drying was performed with an impact mill (Fine Impact Mill AVIS-150, manufactured by Millsystem Co., Ltd.) in place of the disc mill. The results are shown in Table 1.

Comparative Example 1

An experiment was conducted in the same conditions as in Example 1 except that boric acid $H_3BO_3$ (industrial grade), barium carbonate $BaCO_3$ (industrial grade), iron oxide $Fe_2O_3$ (industrial grade), cobalt oxide CoO (reagent grade, 90% or higher), titanium oxide $TiO_2$ (reagent 1st grade), and bismuth oxide $Bi_2O_2$ (industrial grade) were weighed to give a raw material formulation shown in Table 1 and the crystallization treatment temperature was set to a temperature shown in Table 1. The results are shown in Table 1.

Comparative Example 2

An experiment was conducted in the same conditions as in Example 1 except that boric acid $H_3BO_3$ (industrial grade), barium carbonate $BaCO_3$ (industrial grade), iron oxide $Fe_2O_3$ (industrial grade), and niobium oxide $Nb_2O_5$ (industrial grade) were weighed to give a raw material formulation shown in Table 1 and the crystallization treatment temperature was set to a temperature shown in Table 1.

Comparative Example 3

Production of Hexagonal Ferrite Magnetic Powder

Boric acid $H_3BO_3$, barium carbonate $BaCO_3$, iron oxide $Fe_2O_3$, cobalt oxide CoO, niobium oxide $Nb_2O_5$, and aluminum hydroxide $Al(OH)_3$ were weighed to give a raw material formulation shown in Table 1 and were mixed with a mixer to obtain a raw material mixture.

The resulting raw material mixture was melt in a platinum crucible in a melting furnace. The temperature was kept at 1380° C. to make the raw materials into a completely melt state. Then the melt (hot metal) was drawn through a nozzle and was quenched by a water cold twin-rolling method to obtain an amorphous body. The resulting amorphous body was heated and kept at a crystallization treatment temperature of 680° C. for 300 minutes to effect crystallization, thus producing hexagonal ferrite.

Acid washing was performed under the following conditions for removing the remaining substances contained in the powder body obtained by the heating and keeping.

Acid Washing Conditions:

The powder body obtained by the above heating and keeping was roughly pulverized in a mortar. The powder body after the rough pulverization was placed in a 2000 mL glass bottle, and 1000 g of 1-mmφ Zr beads and 800 mL of a 1% acetic acid solution were added and a dispersion treatment with a paint shaker was applied for 3 hours. The resulting dispersion was separated from the beads, the resultant was placed in a 3 L stainless beaker, and was treated at 100° C. for 3 hours. Then, decantation was repeated through a method of precipitating with a centrifugal separator.

The thus obtained solid after acid washing was dried to obtain a hexagonal ferrite magnetic powder. The obtained hexagonal ferrite magnetic powder was investigated for the magnetic powder characteristics and medium characteristics by the same method as in Example 1. The results are shown in Table 1.

In Comparative Example 2, since the Fe site valence $A_{Fe}$ was too high due to a large addition of Nb, the initial SNR of the magnetic recording medium decreased.

In Comparative Example 3, although Co and Nb were added as elements for partially substituting the Fe sites, durability was not be able to be sufficiently improved due to the Fe site valence $A_{Fe}$ which was lower than the range of the present invention.

What is claimed is:

1. A hexagonal ferrite magnetic powder for a magnetic recording medium, comprising hexagonal ferrite magnetic particles having aluminum hydroxide adhered on the surface thereof, the hexagonal ferrite magnetic powder having an Al/Fe molar ratio of 0.030 to 0.200, a Co/Fe molar ratio of 0.002 to 0.030, and a Nb/Fe molar ratio of 0.005 to 0.050,

TABLE 1

| | | Example | | | | | Comparative Example | | |
|---|---|---|---|---|---|---|---|---|---|
| | | 1 | 2 | 3 | 4 | 5 | 1 | 2 | 3 |
| Raw material formulation (g) | $H_3BO_3$ | 869.3 | 869.5 | 840.7 | 836.4 | 869.4 | 832.2 | 844.3 | 752.1 |
| | $BaCO_3$ | 1714.9 | 1715.3 | 1662.5 | 1654.7 | 1715.0 | 1598.7 | 1682.9 | 1531.1 |
| | $Fe_2O_3$ | 975.4 | 967.1 | 967.4 | 965.4 | 972.6 | 902.6 | 1035.1 | 1197.5 |
| | CoO | 4.6 | 12.7 | 9.1 | 9.1 | 7.3 | 8.5 | — | 35.0 |
| | $Nb_2O_5$ | 35.7 | 35.4 | 19.3 | 19.3 | 35.6 | — | 37.7 | 20.8 |
| | $TiO_2$ | — | — | — | — | — | 18.1 | — | — |
| | $Bi_2O_3$ | — | — | 101.1 | 115.2 | — | 104.3 | — | — |
| | $Nd_2O_3$ | — | — | — | — | — | 135.6 | — | — |
| | $Al(OH)_3$ | — | — | — | — | — | — | — | 63.4 |
| Crystallization treatment temperature (° C.) | | 668 | 660 | 660 | 646 | 664 | 670 | 633 | 680 |
| Acid washing conditions | Temperature (° C.) | 60 | 60 | 60 | 60 | 60 | 60 | 60 | 100 |
| | Treatment time | 1 | 1 | 1 | 1 | 1 | 1 | 1 | 3 |
| | Acetic acid concentration (mass %) | 10 | 10 | 10 | 10 | 10 | 10 | 10 | 1 |
| Magnetic powder molar ratio | Ba/(Fe site elements) | 0.096 | 0.095 | 0.094 | 0.095 | 0.094 | 0.093 | 0.093 | 0.085 |
| | Co/Fe | 0.005 | 0.012 | 0.009 | 0.009 | 0.007 | 0.009 | — | 0.029 |
| | Nb/Fe | 0.021 | 0.022 | 0.013 | 0.012 | 0.023 | — | 0.022 | 0.008 |
| | Ti/Fe | — | — | — | — | — | 0.021 | — | — |
| | Bi/Fe | — | — | 0.031 | 0.034 | — | 0.034 | — | — |
| | Nd/Fe | — | — | — | — | — | 0.005 | — | — |
| | Al/Fe | 0.040 | 0.041 | 0.046 | 0.045 | 0.041 | 0.045 | 0.044 | 0.050 |
| | Fe site valence $A_{Fe}$ | 3.037 | 3.030 | 3.017 | 3.016 | 3.038 | 2.991 | 3.043 | 2.987 |
| | Fe site valence $X_{Fe}$ | 3.037 | 3.030 | 3.017 | 3.016 | 3.038 | 3.011 | 3.043 | 2.987 |
| Magnetic powder characteristics | Hc (kA/m) | 210 | 191 | 212 | 221 | 200 | 247 | 205 | 248 |
| | σs ($Am^2$/kg) | 46 | 46 | 44 | 43 | 46 | 43 | 45 | 48 |
| | SQ | 0.52 | 0.51 | 0.52 | 0.53 | 0.51 | 0.55 | 0.51 | 0.55 |
| | SFD | 0.61 | 0.69 | 0.66 | 0.59 | 0.63 | 0.47 | 0.69 | 0.72 |
| | BET ($m^2$/g) | 80 | 85 | 75 | 71 | 83 | 72 | 82 | 82 |
| | Vact ($nm^3$) | 1720 | 1690 | 1660 | 1680 | 1700 | 1670 | 1700 | 1550 |
| Medium characteristics | SNR evaluation | A | A | A | A | A | A | B | A |
| | Durability evaluation | A | A | A | A | A | B | A | B |

The magnetic powders of Examples according to the definition of the present invention were able to simultaneously improve SNR and durability in a magnetic recording medium having a magnetic layer with a high surface smoothness formed.

The magnetic powder of Comparative Example 1 is one in which Co and Ti were applied as elements for partially substituting the Fe sites. Since Nb was not contained, the durability of a magnetic recording medium having a magnetic layer having a high surface smoothness formed was not able to be sufficiently improved. When the reproduction head surface after 5000-pass reciprocating running used in the experiment of Comparative Example 1 was observed with an optical microscope with a 20-fold objective lens, a contaminant derived from the magnetic layer of the magnetic recording medium was attached to the head. That is, it was recognized that "magnetic layer shaving" occurred in the magnetic recording medium.

and having an Fe site valence $A_{Fe}$ of 3.015 to 3.040 as calculated by the following formula (1), wherein a generalized Fe site valence $X_{Fe}$ as calculated by the following formula (2) is equal to $A_{Fe}$:

$$A_{Fe}=(3+2\times[Co/Fe]+5\times[Nb/Fe])/(1+[Co/Fe]+[Nb/Fe]) \quad (1)$$

$$X_{Fe}=(3+2\times[M2/Fe]+4\times[M4/Fe]+5\times[M5/Fe])/(1+[M2/Fe]+[M4/Fe]+[M5/Fe]) \quad (2)$$

wherein [Co/Fe] represents a Co/Fe molar ratio, [Nb/Fe] represents a Nb/Fe molar ratio, [M2/Fe] represents a molar ratio of the divalent transition metals M2's to Fe, [M4/Fe] represents a molar ratio of the tetravalent transition metals M4's to Fe, and [M5/Fe] represents a molar ratio of the pentavalent transition metals M5's to Fe.

2. The hexagonal ferrite magnetic powder for a magnetic recording medium according to claim 1, wherein the hexagonal ferrite magnetic powder has an activation volume Vact of 1400 to 1800 $nm^3$.

3. A hexagonal ferrite magnetic powder for a magnetic recording medium, comprising hexagonal ferrite magnetic particles having aluminum hydroxide adhered on the surface thereof, the hexagonal ferrite magnetic powder having an Al/Fe molar ratio of 0.030 to 0.200, a Co/Fe molar ratio of 0.002 to 0.030, and a Nb/Fe molar ratio of 0.005 to 0.050, and having an Fe site valence $A_{Fe}$ of 3.015 to 3.040 as calculated by the following formula (1), wherein substituting elements of Fe sites consist of Co and Nb:

$$A_{Fe}=(3+2\times[Co/Fe]+5\times[Nb/Fe])/(1+[Co/Fe]+[Nb/Fe]) \quad (1)$$

wherein [Co/Fe] represents a Co/Fe molar ratio and [Nb/Fe] represents a Nb/Fe molar ratio.

* * * * *